United States Patent [19]

Gugumus

[11] Patent Number: 4,929,652

[45] Date of Patent: May 29, 1990

[54] POLYOLEFINS STABILIZED AGAINST DAMAGE CAUSED BY LIGHT

[75] Inventor: François Gugumus, Allschwil, Switzerland

[73] Assignee: Ciba-Geigy Corporation, Ardsley, N.Y.

[21] Appl. No.: 186,835

[22] Filed: Apr. 27, 1988

[30] Foreign Application Priority Data

May 5, 1987 [CH] Switzerland ............ 1708/87

[51] Int. Cl.$^5$ ............ C08K 5/34; C08K 5/54
[52] U.S. Cl. ............ 524/91; 524/95; 524/99; 524/100; 524/102; 524/103; 524/130; 524/133; 524/166; 524/168; 524/287; 524/342; 524/355; 524/357; 524/359; 524/413
[58] Field of Search ............ 524/91, 99, 102, 103, 524/355, 357, 359, 413, 95, 100, 130, 133, 166, 168, 287, 342

[56] References Cited

U.S. PATENT DOCUMENTS

| | | | |
|---|---|---|---|
| 3,935,164 | 1/1976 | Spivack et al. ............ | 524/91 |
| 4,110,304 | 8/1978 | Gilg et al. ............ | 260/45.8 A |
| 4,192,794 | 3/1980 | Wang et al. ............ | 524/291 |
| 4,202,816 | 5/1980 | Moser et al. ............ | 260/45.75 N |
| 4,256,627 | 3/1981 | Moser et al. ............ | 260/45.75 N |
| 4,426,472 | 1/1984 | Berner ............ | 524/99 |
| 4,550,134 | 10/1985 | Isogai et al. ............ | 524/413 |

OTHER PUBLICATIONS

Handbook of Plastics Additives, 2nd Ed. 1983, C. Hanser-Verlag, pp. 161-162.

*Primary Examiner*—John Kight, III
*Assistant Examiner*—Kriellion Morgan
*Attorney, Agent, or Firm*—Stephen V. O'Brien

[57] ABSTRACT

The invention relates to polyolefines stabilized against damage caused by light and containing
(A) at least one polyalkylpiperidine light stabilizer,
(B) an organic salt of zinc or magnesium and
(C) either
 ($C_1$) a UV absorber or
 ($C_2$) a pigment or
 ($C_3$) a UV absorber and a pigment.

13 Claims, No Drawings

POLYOLEFINS STABILIZED AGAINST DAMAGE CAUSED BY LIGHT

The invention relates to the stabilization of polyolefins against damage caused by light by adding a synergistic mixture of stabilizers and co-stabilizers. The primary stabilizer in this mixture is a polyalkylpiperidine; the co-stabilizer is an organic salt of zinc or magnesium. The mixture also contains, in addition, a UV absorber and/or a pigment.

Polyalkylpiperidines are known as excellent light stabilizers for organic materials, particularly for polyolefins. It is also generally known to use metal salts of fatty acids, for example calcium stearate, as processing aids in polyolefins. Complexes of polyalkylpiperidines with metal compounds which are more effective than the particular polyalkylpiperidine on its own are indicated in U.S. Pat. No. 4,202,816. Examples of metal compounds in these complexes are nickel, cobalt, magnesium or manganese acetylacetonate, nickel, cobalt, magnesium or manganese benzoylacetonate, nickel laurate and oenanthate, zinc laurate and zinc acetate. Analogous metal complexes with polymeric polyalkylpiperidines are described in U.S. Pat. No. 4,256,627, nickel acetate, oenanthate and laurate, nickel acetylacetonate, cobalt acetylacetonate and zinc oenanthate being listed as examples of the metal compound.

It is also known that polyalkylpiperidine light stabilizers can be combined with UV absorbers. Combinations of this type are described, for example, in styrene polymers (U.S. Pat. No. 4,110,304), in paint resins (U.S. Pat. No. 4,426,472) or in unpigmented polypropylene (Gächter, Müller, Taschenbuch der Kunststoff-Additive (Manual of Additives for Plastics), 2nd edition 1983, pages 161/162, Carl Hanser-Verlag).

It is also generally known that pigmented polymers are less susceptible to damage by light than unpigmented polymers. It is shown in Gächter, Müller (loc. cit.), page 162, that the stability to light of polypropylene stabilized with polyalkylpiperidines can be increased considerably by pigmenting with 0.5% of various pigments.

It has now been found, that, beyond the known effects, a further increase in effectiveness can be achieved if, in addition to a polyalkylpiperidine light stabilizer, an organic salt of zinc or magnesium and a UV absorber and/or a pigment are added to the polyolefin.

The invention therefore relates to a polyolefin stabilized against damage caused by light and containing
(A) at least one polyalkylpiperidine light stabilizer,
(B) an organic salt of zinc or magnesium and
(C) either
　($C_1$) a UV absorber or
　($C_2$) a pigment or
　($C_3$) a UV absorber and a pigment.

Polyolefins are to be understood as meaning any homopolymers and copolymers of α-olefins, for example polyethylene, polypropylene, polyisobutylene, polybut-1-ene, polymethylpent-1-ene, ethylene/propylene copolymer (CP), propylene/but-1-ene CP, propylene/isobutylene CP, ethylene/but-1-ene CP, ethylene/alkyl acrylate CP, ethylene/vinyl acetate CP, ethylene/acrylic acid CP or ethylene/propylene/diene terpolymers and also mixtures (polyblends) of such olefin polymers with one another or with other polymers.

The stabilization, in accordance with the invention, of polypropylene is of particular importance.

The polyalkylpiperidine light stabilizers which can be employed in accordance with the invention can be low-molecular (MW <700) or high-molecular (oligomers or polymers). They contain the characteristic group I

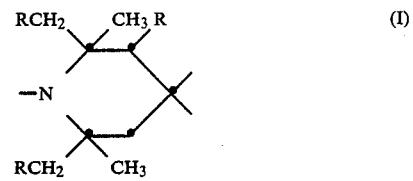

in which R is hydrogen or methyl. This group can occur once or several times in the molecule. Piperidine derivatives containing the group I in which R is hydrogen are preferred. These are derivatives of 2,2,6,6-tetramethylpiperidine. These polyalkylpiperidines preferably carry one or two polar substituents in the 4-position, or a polar spiro ring system is attached to the 4-position. The following classes of polyalkylpiperidines in particular are of importance as light stabilizers.

(a) Compounds of the formula II

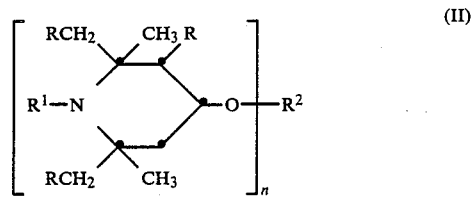

in which n is a number from 1 to 4, preferably 1 or 2, R is hydrogen or methyl, $R^1$ is hydrogen, amine oxide, $C_1$–$C_{12}$alkyl, $C_3$–$C_8$alkenyl, $C_3$–$C_8$alkynyl, $C_7$–$C_{12}$aralkyl, $C_1$–$C_8$alkanoyl, $C_3$–$C_5$alkenoyl, glycidyl or a group —$CH_2CH(OH)$—Z in which Z is hydrogen, methyl or phenyl, $R^1$ being preferably $C_1$–$C_4$alkyl, allyl, benzyl, acetyl or acryloyl and, if n is 1, $R^2$ is hydrogen, $C_1$–$C_{18}$alkyl which can be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 C atoms, a cycloaliphatic carboxylic acid having 7 to 15 C atoms, an α,β-unsaturated carboxylic acid having 3 to 5 C atoms or an aromatic carboxylic acid having 7 to 15 C atoms, and, if n is 2, $R^2$ is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C atoms, a cycloaliphatic or aromatic dicarboxylic acid having 8–14 C atoms or an aliphatic, cycloaliphatic or aromatic dicarbamic acid having 8–14 C atoms, and, if n is 3, $R^2$ is a trivalent radical of an aliphatic, cycloaliphatic or aromatic tricarboxylic acid, an aromatic tricarbamic acid or a phosphorus-containing acid or a trivalent silyl radical, and, if n is 4, $R^2$ is a tetravalent radical of an aliphatic, cycloaliphatic or aromatic tetracarboxylic acid.

If any substituents are $C_1$–$C_{12}$alkyl, examples of these are methyl, ethyl, n-propyl, n-butyl, sec-butyl, tert-butyl, n-hexyl, n-octyl, 2-ethylhexyl, n-nonyl, n-decyl, n-undecyl or n-dodecyl.

As $C_1$–$C_{18}$alkyl, $R^1$ or $R^2$ can be, for example, the groups listed above and, for example, also n-tridecyl, n-tetradecyl, n-hexadecyl or n-octadecyl.

Examples of $R^1$ as $C_3$–$C_8$alkenyl can be 1-propenyl, allyl, methallyl, 2-butenyl, 2-pentenyl, 2-hexenyl, 2-octenyl or 4-tert-butyl-2-butenyl.

As $C_3$–$C_8$alkinyl $R^1$ is preferably propargyl.

As $C_7$–$C_{12}$aralkyl, $R^1$ is especially phenethyl and particularly benzyl.

Examples of $R^1$ as $C_1$–$C_8$alkanoyl are formyl, propionyl, butyryl or octanoyl, but preferably acetyl; as $C_3$–$C_5$alkenoyl it is especially acryloyl.

Examples of $R^2$ as a monovalent radical of a carboxylic acid are an acetic acid, caproic acid, stearic acid, acrylic acid, methacrylic acid, benzoic acid or β-(3,5-ditert-butyl-4-hydroxyphenyl)-propionic acid radical.

Examples of $R^2$ as a divalent radical of a dicarboxylic acid are a malonic acid, succinic acid, glutaric acid, adipic acid, suberic acid, sebacic acid, maleic acid, phthalic acid, dibutylmalonic acid, dibenzylmalonic acid, butyl-(3,5-ditert-butyl-4-hydroxybenzyl)-malonic acid or bicycloheptene-dicarboxylic acid radical.

Examples of $R^2$ as a trivalent radical of a tricarboxylic acid are a trimellitic acid or a nitrilotriacetic acid radical.

Examples of $R^2$ as a tetravalent radical of a tetracarboxylic acid are the tetravalent radical of butane-1,2,3,4-tetracarboxylic acid or of pyromellitic acid.

Examples of $R^2$ as a divalent radical of a dicarbamic acid are a hexamethylenedicarbamic acid or a 2,4-toluylenedicarbamic acid radical.

The following compounds are examples of polyalkylpiperidine compounds of this class:
(1) 4-hydroxy-2,2,6,6-tetramethylpiperidine
(2) 1-allyl-4-hydroxy-2,2,6,6-tetramethylpiperidine
(3) 1-benzyl-4-hydroxy-2,2,6,6-tetramethylpiperidine
(4) 1-(4-tert-butyl-2-butenyl)-4-hydroxy-2,2,6,6-tetramethylpiperidine
(5) 4-stearoyloxy-2,2,6,6-tetramethylpiperidine
(6) 1-ethyl-4-salicyloyloxy-2,2,6,6-tetramethylpiperidine
(7) 4-methacryloyloxy-1,2,2,6,6-pentamethylpiperidine
(8) 1,2,2,6,6-pentamethylpiperidin-4-yl β-(3,5-ditert-butyl-4-hydroxyphenyl)-propionate
(9) di-(1-benzyl-2,2,6,6-tetramethylpiperidin-4-yl) maleate
(10) di-(2,2,6,6-tetramethylpiperidin-4-yl) succinate
(11) di-(2,2,6,6-tetramethylpiperidin-4-yl) glutarate
(12) di-(2,2,6,6-tetramethylpiperidin-4-yl) adipate
(13) di-(2,2,6,6-tetramethylpiperidin-4-yl) sebacate
(14) di-(1,2,2,6,6-pentamethylpiperidin-4-yl) sebacate
(15) di-(1,2,3,6-tetramethyl-2,6-diethylpiperidin-4-yl) sebacate
(16) di-(1-allyl-2,2,6,6-tetramethylpiperidin-4-yl) phthalate
(17) 1-propargyl-4-β-cyanoethoxy-2,2,6,6-tetramethylpiperidine
(18) 1-acetyl-2,2,6,6-tetramethylpiperidin-4-yl acetate
(19) tri-(2,2,6,6-tetramethylpiperidin-4-yl) trimellitate
(20) 1-acryloyl-4-benzyloxy-2,2,6,6-tetramethylpiperidine
(21) di-(2,2,6,6-tetramethylpiperidin-4-yl) diethylmalonate
(22) di-(1,2,2,6,6-pentamethylpiperidin-4-yl) dibutylmalonate
(23) di-(1,2,2,6,6-pentamethylpiperidin-4-yl) butyl-(3,5-ditert-butyl-4-hydroxybenzyl)-malonate
(24) di-(1,2,2,6,6-pentamethylpiperidin-4-yl) dibenzylmalonate
(25) di-(1,2,3,6-tetramethyl-2,6-diethylpiperidin-4-yl) dibenzylmalonate
(26) hexane-1',6'-bis-(4-carbamoyloxy-1-n-butyl-2,2,6,6-tetramethylpiperidine)
(27) toluene-2',4'-bis-(4-carbamoyloxy-1-n-propyl-2,2,6,6-tetramethylpiperidine)
(28) dimethyl-bis-(2,2,6,6-tetramethylpiperidin-4-oxy)-silane
(29) phenyl-tris-(2,2,6,6-tetramethylpiperidin-4-oxy)-silane
(30) tris-(1-propyl-2,2,6,6-tetramethylpiperidin-4-yl) phosphite
(31) tris-(1-propyl-2,2,6,6-tetramethylpiperidin-4-yl) phosphate
(32) bis-(1,2,2,6,6-pentamethylpiperidin-4-yl) phenylphosphonate
(33) 4-hydroxy-1,2,2,6,6-pentamethylpiperidine
(34) 4-hydroxy-N-hydroxyethyl-2,2,6,6-tetramethylpiperidine
(35) 4-hydroxy-N-(2-hydroxypropyl)-2,2,6,6-tetramethylpiperidine
(36) 1-glycidyl-4-hydroxy-2,2,6,6-tetramethylpiperidine (b) Compounds of the formula (III)

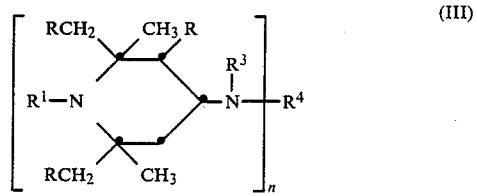

in which n is the number 1 or 2, R and $R^1$ are as defined under (a), $R^3$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl or benzoyl and, if n is 1, $R^4$ is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, glycidyl or a group of the formula —CH$_2$—CH(OH)—Z or of the formula —CONH—Z in which Z is hydrogen, methyl or phenyl; if n is 2, $R^4$ is $C_2$–$C_{12}$alkylene, $C_6$–$C_{12}$arylene, xylylene, a —CH$_2$—CH(OH)—CH$_2$— group or a group —CH$_2$—CH(OH)—CH$_2$—O—D—O— in which D is $C_2$–$C_{10}$alkylene, $C_6$–$C_{15}$arylene or $C_6$–$C_{12}$cycloalkylene or, provided that $R^3$ is not alkanoyl, alkenoyl or benzoyl, $R^4$ can also be a divalent radical of an aliphatic, cycloaliphatic or aromatic dicarboxylic acid or dicarbamic acid or the group —CO—, or, if n is 1, $R^3$ and $R^4$ together can be the divalent radical of an aliphatic, cycloaliphatic or aromatic 1,2-dicarboxylic or 1,3-dicarboxylic acid.

If any substituents are $C_1$–$C_{12}$alkyl or $C_1$–$C_{18}$alkyl, they are as already defined under (a).

If any substituents are $C_5$–$C_7$cycloalkyl, they are especially cyclohexyl.

As $C_7$–$C_8$aralkyl, $R^3$ is especially phenylethyl or particularly benzyl. As $C_2$–$C_5$hydroxyalkyl, $R^3$ is especially 2-hydroxyethyl or 2-hydroxypropyl.

Examples of $R^3$ as $C_2$–$C_{18}$alkanoyl are propionyl, butyryl, octanoyl, dodecanoyl, hexadecanoyl or octadecanoyl, but preferably acetyl, and as $C_3$–$C_5$alkenoyl $R^3$ is especially acryloyl.

Examples of R⁴ as $C_2-C_8$alkenyl are allyl, methallyl, 2-butenyl, 2-pentenyl, 2-hexenyl or 2-octenyl.

Examples of R⁴ as $C_1-C_4$alkyl which is substituted by a hydroxyl, cyano, alkoxycarbonyl or carbamide group can be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)-ethyl.

Examples of possible $C_2-C_{12}$alkylene substituents are ethylene, propylene, 2,2-dimethylpropylene, tetramethylene, hexamethylene, octamethylene, decamethylene or dodecamethylene.

Examples of possible $C_6-C_{15}$arylene substituents are o-, m- or p-phenylene, 1,4-naphthylene or 4,4'-diphenylene.

As $C_6-C_{12}$cycloalkylene, D is especially cyclohexylene.

The following compounds are examples of polyalkylpiperidine compounds of this class:
(37) N,N'-bis-(2,2,6,6-tetramethylpiperidin-4-yl)-hexamethylen-1,6-diamine
(38) N,N'-bis-(2,2,6,6-tetramethylpiperidin-4-yl)-hexamethylene-1,6-diacetamide
(39) 1-acetyl-4-(N-cyclohexylacetamido)-2,2,6,6-tetramethylpiperidine
(40) 4-benzoylamino-2,2,6,6-tetramethylpiperidine
(41) N,N'-bis-(2,2,6,6-tetramethylpiperidin-4-yl)-N,N'-dibutyladipamide
(42) N,N'-bis-(2,2,6,6-tetramethylpiperidin-4-yl)-N,N'-dicyclohexyl-2-hydroxypropylene-1,3-diamine
(43) N,N'-bis-(2,2,6,6-tetramethylpiperidin-4-yl)-p-xylylene-diamine
(44) N,N'-bis-(2,2,6,6-tetramethylpiperidin-4-yl)-succindiamide
(45) di-(2,2,6,6-tetramethylpiperidin-4-yl) N-(2,2,6,6-tetramethylpiperidin-4-yl)-β-aminodipropionate
(46) the compound of the formula

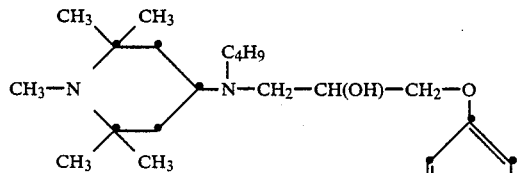

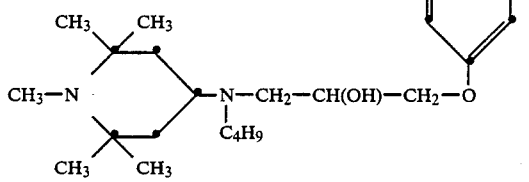

(47) 4-(bis-2-hydroxyethylamino)-1,2,2,6,6-pentamethylpiperidine
(48) 4-(3-methyl-4-hydroxy-5-tert-butylbenzamido)-2,2,6,6-tetramethylpiperidine
(49) 4-methacrylamido-1,2,2,6,6-pentamethylpiperidine (c) Compounds of the formula (IV)

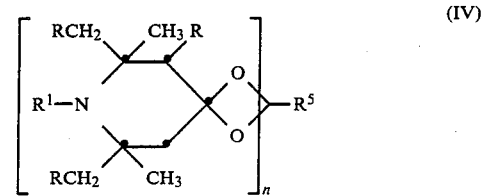

in which n is the number 1 or 2, R and R¹ are as defined under (a), and, if n is 1, R⁵ is $C_2-C_8$alkylene or $C_2-C_8$hydroxyalkylene or $C_4-C_{22}$acyloxyalkylene or, if n is 2, R⁵ is the group $(-CH_2)_2C(CH_2-)_2$.

Examples of R⁵ as $C_2-C_8$alkylene or $C_2-C_8$hydroxyalkylene are ethylene, 1-methylethylene, propylene, 2-ethylpropylene or 2-ethyl-2-hydroxymethylpropylene.

An example of R⁵ as $C_4-C_{22}$acyloxyalkylene is 2-ethyl-2-acetoxymethylpropylene.

The following compounds are examples of polyalkylpiperidine compounds of this class:
(50) 9-aza-8,8,10,10-tetramethyl-1,5-dioxaspiro[5.5]undecane
(51) 9-aza-8,8,10,10-tetramethyl-3-ethyl-1,5-dioxaspiro[5.5]undecane
(52) 8-aza-2,7,7,8,9,9-hexamethyl-1,4-dioxaspiro[4.5]decane
(53) 9-aza-3-hydroxymethyl-3-ethyl-8,8,9,10,10-pentamethyl-1,5-dioxaspiro[5.5]undecane
(54) 9-aza-3-ethyl-3-acetoxymethyl-9-acetyl-8,8,10,10-tetramethyl-1,5-dioxaspiro[5.5]undecane
(55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d) Compounds of the formulae VA, VB and VC

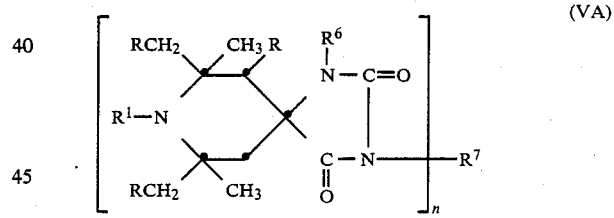

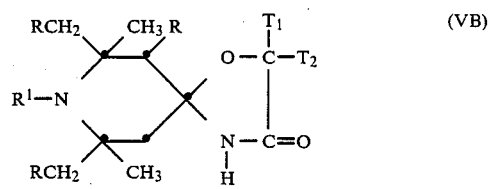

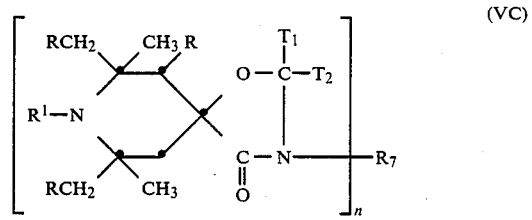

in which n is the number 1 or 2, R and R¹ are as defined under (a), R⁶ is hydrogen, $C_1-C_{12}$alkyl, allyl, benzyl, glycidyl or $C_2-C_6$alkoxyalkyl and, if n is 1, R⁷ is hydrogen, $C_1-C_{12}$alkyl, $C_3-C_5$alkenyl, $C_7-C_9$aralkyl, $C_5-C_7$- cycloalkyl, $C_2$-$C_4$hydroxyalkyl, $C_2$-$C_6$alkoxyalkyl, $C_6$-$C_{10}$aryl, glycidyl or a group of the formula —(CH$_2$)$_p$—COO—Q or of the formula —(CH$_2$)$_p$—O—CO—Q in which p is 1 or 2 and Q is $C_1$-$C_4$alkyl or phenyl, or, if n is 2, $R^7$ is $C_2$-$C_{12}$alkylene, $C_4$-$C_{12}$alkenylene, $C_6$-$C_{12}$arylene, a group —CH$_2$—CH(OH)—CH$_2$—O—D—O—CH$_2$—CH(OH)—CH$_2$— in which D is $C_2$-$C_{10}$alkylene, $C_6$-$C_{15}$arylene or $C_6$-$C_{12}$cycloalkylene, or $R^7$ is a group —CH$_2$CH(OZ')CH$_2$—(OCH$_2$—CH(OZ')CH$_2$)$_2$— in which Z' is hydrogen, $C_1$-$C_{18}$alkyl, allyl, benzyl, $C_2$-$C_{12}$alkanoyl or benzoyl, and $T_1$ and $T_2$ independently of one another are hydrogen, $C_1$-$C_{18}$alkyl or $C_6$-$C_{10}$aryl or $C_7$-$C_9$aralkyl each of which is unsubstituted or substituted by halogen or $C_1$-$C_4$alkyl, or $T_1$ and $T_2$, together with the C atom linking them, form a $C_5$-$C_{12}$cycloalkane ring.

Examples of possible $C_1$-$C_{12}$alkyl substituents are methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of possible $C_1$-$C_{18}$alkyl substituents can be the groups listed above and, additionally, n-tridecyl, n-tetradecyl, n-hexadecyl or n-octadecyl, for example.

Examples of possible $C_2$-$C_6$alkoxyalkyl substituents are methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $R^7$ as $C_3$-$C_5$alkenyl are 1-propenyl, allyl, methallyl, 2-butenyl or 2-pentenyl.

As $C_7$-$C_9$aralkyl, $R^7$, $T_1$ and $T_2$ are especially phenethyl or particularly benzyl. If $T_1$ and $T_2$, together with the C atom, form a cycloalkane ring, this can be, for example, a cyclopentane, cyclohexane, cyclooctane or cyclododecane ring.

Examples of $R^7$ as $C_2$-$C_4$hydroxyalkyl are 2-hydroxyethyl, 2-hydroxypropyl, 2-hydroxybutyl or 4-hydroxybutyl.

As $C_6$-$C_{10}$aryl, $R^7$, $T_1$ and $T_2$ are especially phenyl, α-naphthyl or β-naphthyl each of which is unsubstituted or substituted by halogen or $C_1$-$C_4$alkyl.

Examples of $R^7$ as $C_2$-$C_{12}$alkylene are ethylene, propylene, 2,2-dimethylpropylene, tetramethylene, hexamethylene, octamethylene, decamethylene or dodecamethylene.

As $C_4$-$C_{12}$alkenylene, $R^7$ is especially 2-butenylene, 2-pentenylene or 3-hexenylene.

Examples of $R^7$ as $C_6$-$C_{12}$arylene are o-, m-or p-phenylene, 1,4-naphthylene or 4,4'-diphenylene.

Examples of Z' as $C_2$-$C_{12}$alkanoyl are propionyl, butyryl, octanoyl or dodecanoyl, but preferably acetyl.

As $C_2$-$C_{10}$alkylene, $C_6$-$C_{15}$arylene or $C_6$-$C_{12}$cycloalkylene, D is as defined under (b).

The following compounds are examples of polyalkylpiperidine compounds of this class:
(56) 3-benzyl-1,3,8-triaza-7,7,9,9-tetramethylspiro[4.5]decane-2,4-dione
(57) 3-n-octyl-1,3,8-triaza-7,7,9,9-tetramethylspiro[4.5]decane-2,4-dione
(58) 3-allyl-1,3,8-triaza-1,7,7,9,9-pentamethylspiro[4.5]decane-2,4-dione
(59) 3-glycidyl-1,3,8-triaza-7,7,8,9,9-pentamethylspiro[4.5]decane-2,4-dione
(60) 1,3,7,7,8,9,9-heptamethyl-1,3,8-triazaspiro[4.5]decane-2,4-dione
(61) 2-isopropyl-7,7,9,9-tetramethyl-1-oxa-3,8-diaza-4-oxo-spiro[4.5]decane
(62) 2,2-dibutyl-7,7,9,9-tetramethyl-1-oxa-3,8-diaza-4-oxo-spiro[4.5]decane
(63) 2,2,4,4-tetramethyl-7-oxa-3,20-diaza-21-oxo-dispiro[5.1.11.2]-heneicosane
(64) 2-butyl-7,7,9,9-tetramethyl-1-oxa-4,8-diaza-3-oxo-spiro[4.5]decane
(65) 8-acetyl-3-dodecyl-1,3,8-triaza-7,7,9,9-tetramethylspiro[4.5]decane-2,4-dione or the compounds of the following formulae:

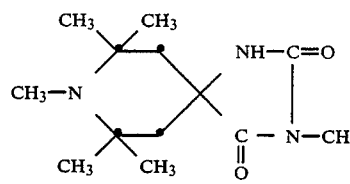
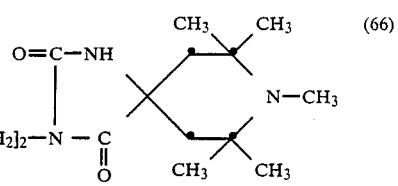

(66)

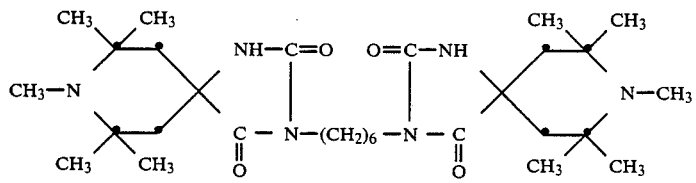

(67)

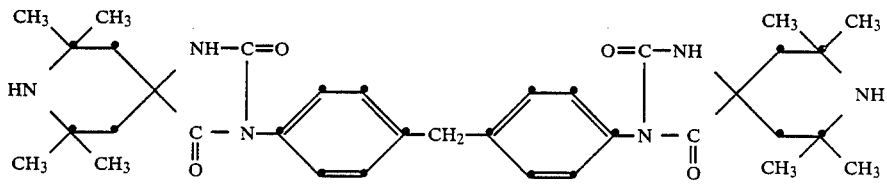

(68)

(69)

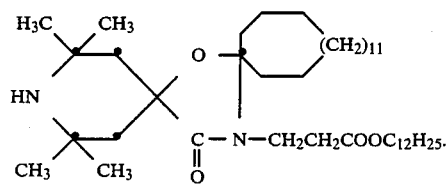

(e) Compounds of the formula VI

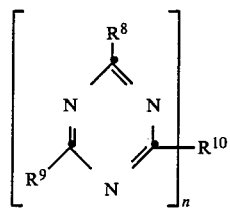
(VI)

in which n is the number 1 or 2 and $R^8$ is a group of the formula

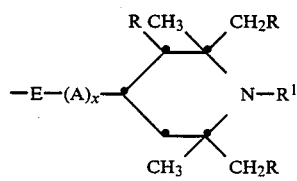

in which R and $R^1$ are as defined under (a), E is —O— or —$NR^{11}$—, A is $C_2$–$C_6$alkylene or —$(CH_2)_3$—O— and x is the numbers 0 or 1, $R^9$ is the same as $R^8$ or is one of the groups —$NR^{11}R^{12}$, —$OR^{13}$, —$NHCH_2OR^{13}$ or —$N(CH_2OR^{13})_2$ and, if n is 1, $R^{10}$ is the same as $R^8$ or $R^9$, and, if n is 2, $R^{10}$ is a group —E—B—E— in which B is $C_2$–$C_6$alkylene which can be interrupted by —$N(R^{11})$—, $R^{11}$ is $C_1$–$C_{12}$alkyl, cyclohexyl, benzyl or $C_1$–$C_4$hydroxyalkyl or a group of the formula

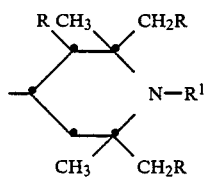

$R^{12}$ is $C_1$–$C_{12}$alkyl, cyclohexyl, benzyl or $C_1$–$C_4$hydroxyalkyl and $R^{13}$ is hydrogen, $C_1$–$C_{12}$alkyl or phenyl, or $R^{11}$ and $R^{12}$ together are $C_4$–$C_5$alkylene or $C_4$–$C_5$oxaalkylene, for example

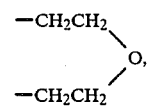

or a group of the formula

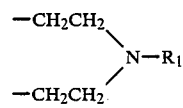

or $R^{11}$ and $R^{12}$ are each a group of the formula

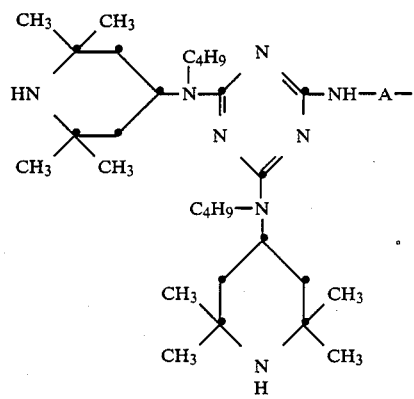

Examples of possible $C_1$–$C_{12}$alkyl substituents are methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of possible $C_1$–$C_4$hydroxyalkyl substituents are 2-hydroxyethyl, 2-hydroxypropyl, 3-hydroxypropyl, 2-hydroxybutyl or 4-hydroxybutyl.

Examples of A as $C_2$–$C_6$alkylene are ethylene, propylene, 2,2-dimethylpropylene, tetramethylene or hexamethylene.

Examples of $R^{11}$ and $R^{12}$ jointly as $C_4$–$C_5$alkylene or $C_4$–$C_5$oxaalkylene are tetramethylene, pentamethylene or 3-oxapentamethylene.

The compounds of the following formulae are examples of polyalkylpiperidine compounds of this class:

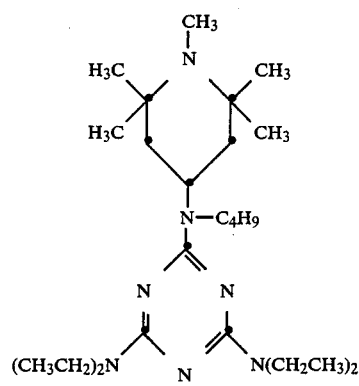
(70)
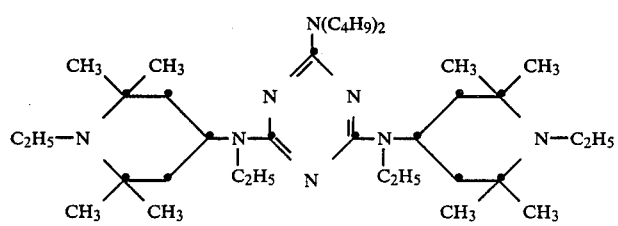
(71)
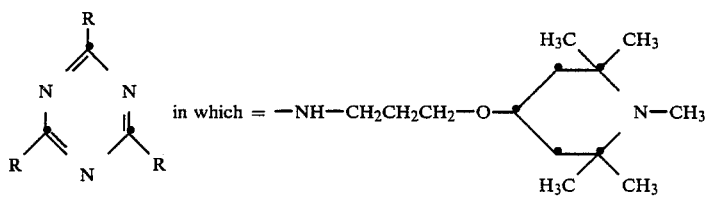
(72)
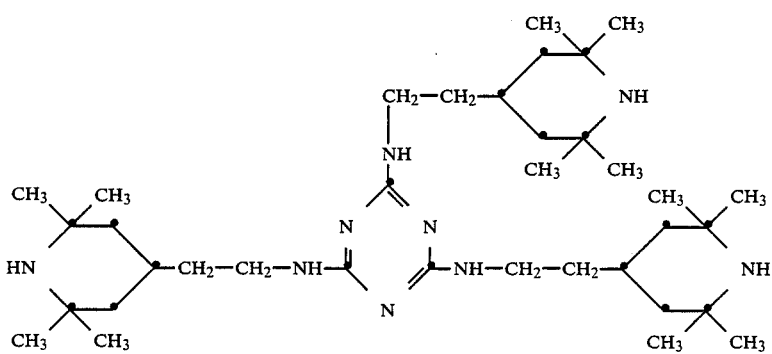
(73)
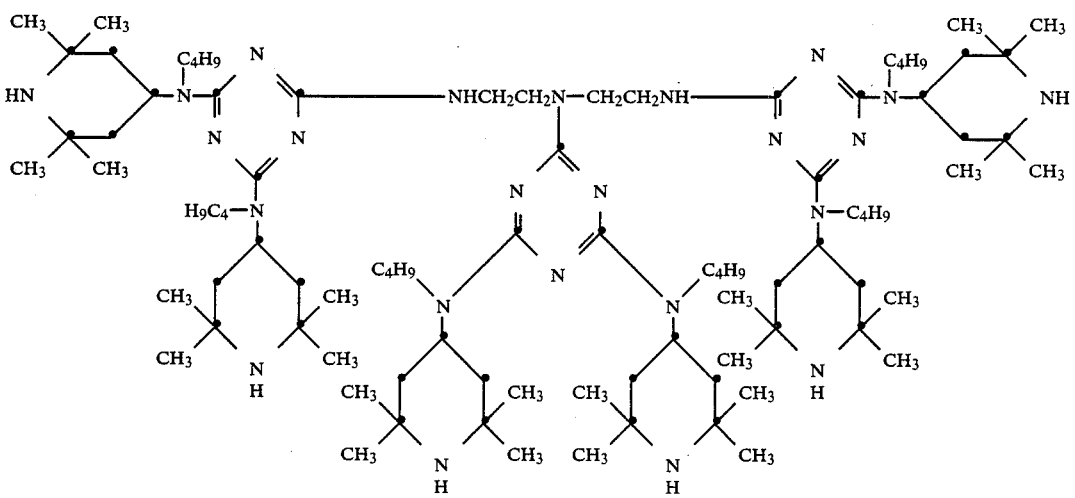
(74)

-continued
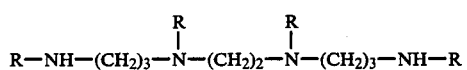
(75)
in which = 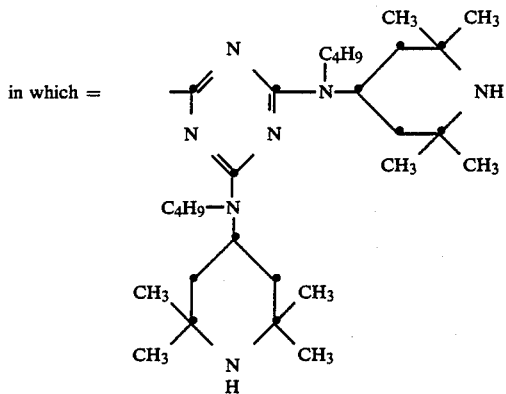
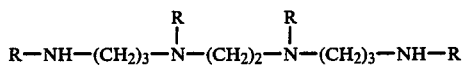
(76)
in which = 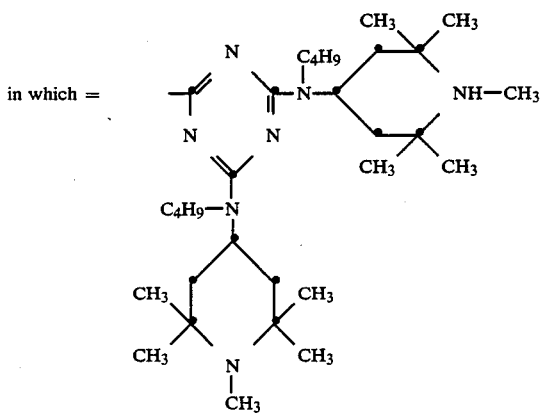
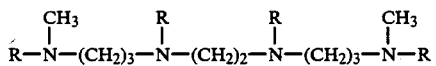
(77)
in which = 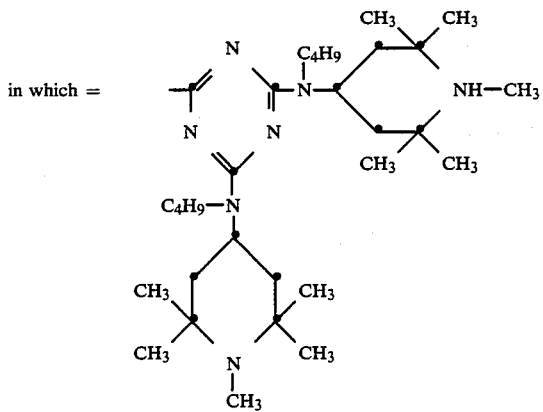

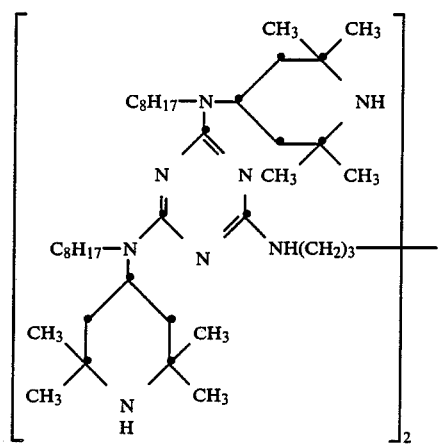

(78)

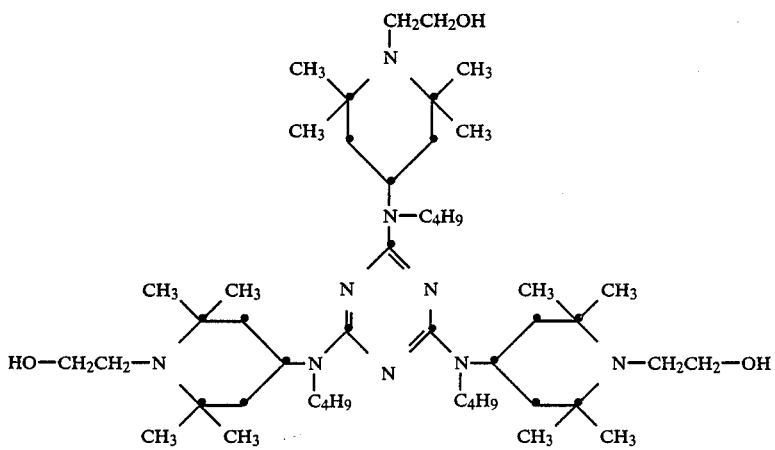

(79)

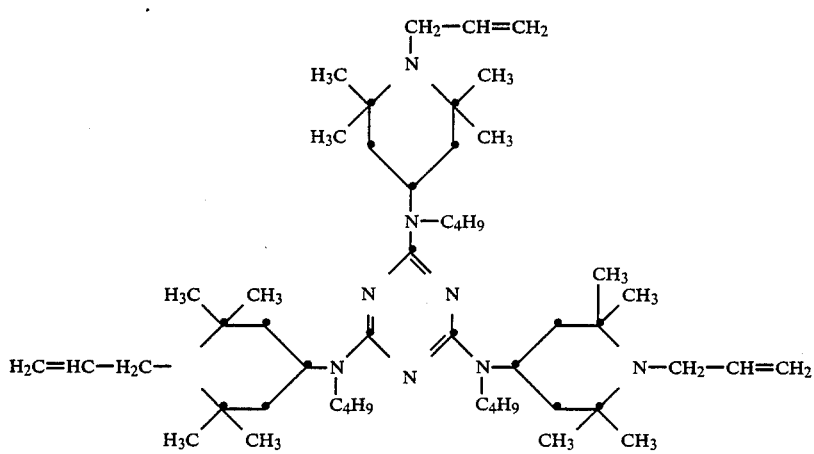

(80)

(f) Oligomeric or polymeric compounds in which the recurring structural unit contains a 2,2,6,6-tetraalkylpiperidine radical of the formula (I), in particular polyesters, polyethers, polyamides, polyamines, polyurethanes, polyureas, polyaminotriazines, poly(meth)acrylates, poly(meth)acrylamides and copolymers thereof containing radicals of this type.

The compounds of the following formulae in which m is a number from 2 to about 200 are examples of 2,2,6,6-polyalkylpiperidine light stabilizers of this class.

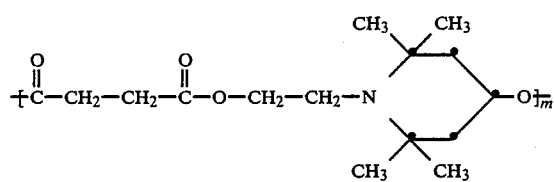
(81)
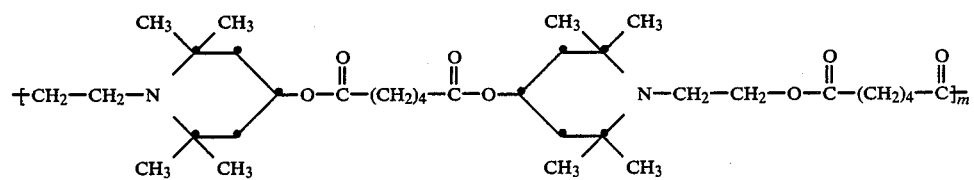
(82)
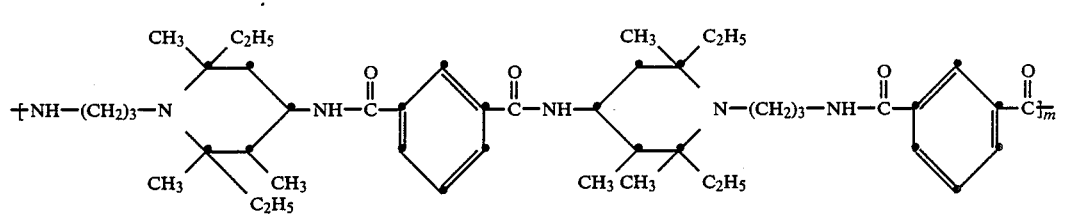
(83)
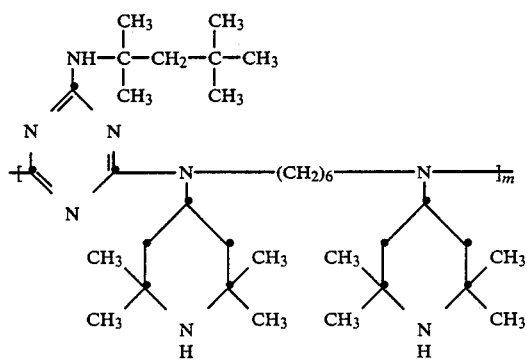
(84)
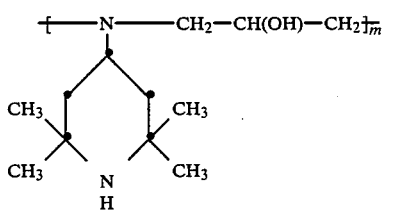
(85)
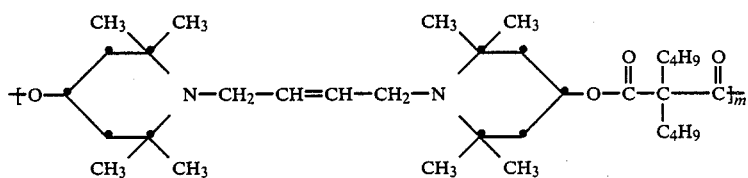
(86)

-continued
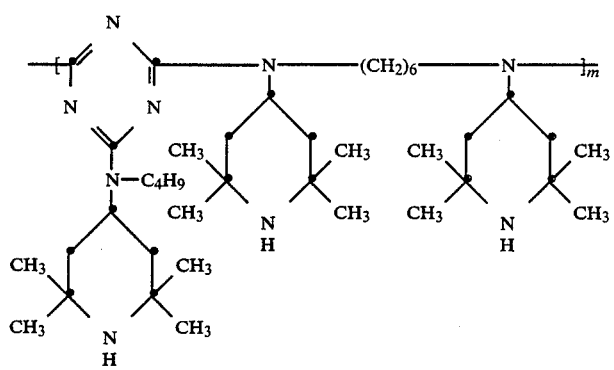
(87)
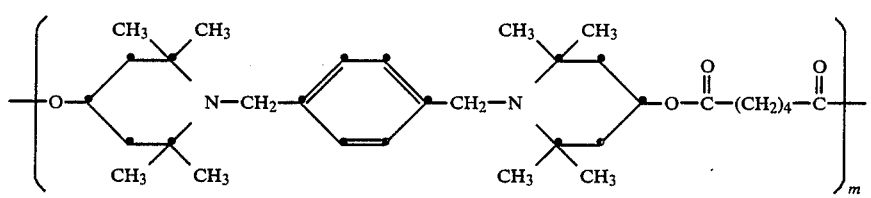
(88)
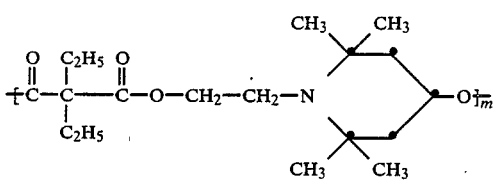
(89)
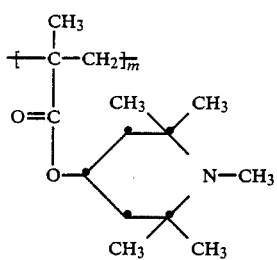
(90)
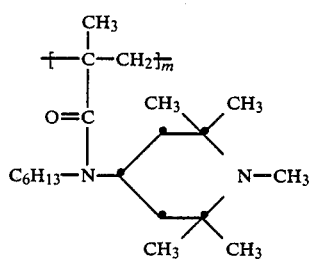
(91)

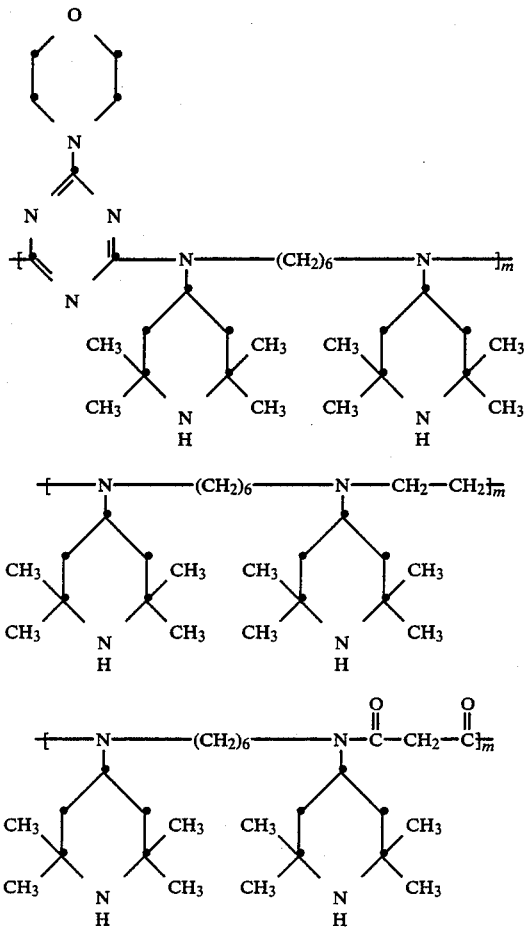

(92)

(93)

(94)

Of these classes of compounds, classes (a), (d), (e) and (f) are particularly suitable, especially compounds Nos. 10, 12, 13, 14, 21, 63, 75, 77, 81, 84, 92 and 93.

The amount of the component A added depends on the substrate and the desired degree of stabilization. In general, 0.01 to 5% by weight, preferably 0.025 to 2% by weight, relative to the polyolefin, is added.

The zinc and magnesium salts used as the component B are preferably compounds of the formula $MeL_2$ in which Me is zinc or magnesium and L is the anion of an organic acid or of an enol. The organic acid can, for example, be a sulfonic acid, sulfinic acid, phosphonic acid or phosphinic acid, but is preferably a carboxylic acid. The acid can be aliphatic, aromatic, araliphatic or cycloaliphatic, it can be linear or branched, it can be substituted by hydroxyl or alkoxy groups, it can be saturated or unsaturated and it preferably contains up to 24 C atoms.

Examples of carboxylic acids of this type are formic, acetic, propionic, butyric, isobutyric, caprioic, 2-ethylcaproic, caprylic, capric, lauric, palmitic, stearic, behenic, oleic, lactic, ricinoleic, 2-ethoxypropionic, benzoic, salicylic, 4-butylbenzoic, toluic, 4-dodecylbenzoic, phenylacetic, naphthylacetic, cyclohexanecarboxylic, 4-butylcyclohexanecarboxylic or cyclohexylacetic acid. The carboxylic acid can also be a technical mixture of carboxylic acids, for example technical mixtures of fatty acids or mixtures of alkylated benzoic acids.

Examples of organic acids containing sulfur or phosphorus are methanesulfonic, ethanesulfonic, α,α-dimethylethanesulfonic, n-butanesulfonic, n-dodecanesulfonic, benzenesulfonic, toluenesulfonic, 4-nonylbenzenesulfonic, 4-dodecylbenzenesulfonic or cyclohexanesulfonic acid, dodecanesulfinic, benzenesulfinic or naphthalenesulfinic acid, butylphosphonic acid, phenylphosphonic acid, monomethyl or monoethyl phenylphosphonate, monobutyl benzylphosphonate, dibutylphosphinic acid or diphenylphosphinic acid.

If L is an enolate anion, it is preferably an anion of a β-dicarbonyl compound or of an o-acylphenol. Examples of β-dicarbonyl compounds are acetylacetone, benzoylacetone, dibenzoylmethane, ethyl acetoacetate, butyl acetoacetate, lauryl acetoacetate or α-acetylcyclohexanone. Examples of o-acylphenols are 2-acetylphenol, 2-butyroylphenol, 2-acetyl-1-naphthol, 2-benzoylphenol or salicylaldehyde. The enolate is preferably the anion of a β-dicarbonyl compound having 5-20 C atoms.

The following are preferably used as the component B: magnesium acetate, laurate and stearate, zinc formate, acetate, oenanthate, laurate and stearate and zinc acetylacetonate or magnesium acetylacetonate.

It is also possible to use mixtures of several magnesium salts or several zinc salts or mixtures of zinc salts and magnesium salts.

The metal salts of the component B are preferably added to the polyolefins in an amount of 0.005 to 1%, in particular 0.05 to 0.5%, relative to the polyolefin.

The UV absorbers of the component C can, for example, be UV absorbers of the type comprising 2-(2-hydroxyphenyl)-benzotriazoles, 2-hydroxybenzophenones, oxanilides, hydroxylated aryl benzoates, hydroxyphenyltriazines or cinnamic acid derivatives.

The following are examples of benzotriazole UV absorbers: 2-(2-hydroxy-5-methylphenyl)-benzotriazole, 2-(2-hydroxy-5-tert-butylphenyl)-benzotriazole, 2-(2-hydroxy-3,5-ditert-butylphenyl)-benzotriazole, 5-chloro-2-(2-hydroxy-3-tert-butyl-5-methylphenyl)-benzotriazole, 5-chloro-2-(2-hydroxy-3,5-ditert-butyl-5-methylphenyl)-benzotriazole, 2-(2-hydroxy-3-tert-phenyl-5-methyl)-benzotriazole, 2-(2-hydroxy-3,5-ditert-amyl)-benzotriazole, 2-(2-hydroxy-3-sec-butyl-5-tert-butyl)-benzotriazole, 2-(2-hydroxy-4-octyloxy)-benzotriazole, 2-(2-hydroxy-5-tert-octyl)-benzotriazole, 2-[2-hydroxy-3,5-di($\alpha,\alpha$-dimethylbenzyl)phenyl]-benzotriazole, 5-chloro-2-[2-hydroxy-3-tert-butyl-5-(2-octyloxycarbonyl)ethylphenyl]benzotriazole.

The following are examples of benzophenone UV absorbers: 2,4-dihydroxybenzophenone, 2-hydroxy-4-methoxybenzophenone, 2-hydroxy-4-octyloxybenzophenone, 2-hydroxy-4-decyloxybenzophenone, 2-hydroxy-4-dodecyloxybenzophenone, 2-hydroxy-4-benzyloxybenzophenone, 2,2'-dihydroxy-4,4'-dimethoxybenzophenone, 2,2',4,4'-tetrahydroxybenzophenone, 2,4-dihydroxy-4'-tert-butyl-benzophenone.

The following are examples of oxanilide UV absorbers: 2-ethyl-2'-ethoxyoxanilide, 2-ethyl-2'-ethoxy-5'-tert-butyloxanilide, 4-dodecyl-2'-ethoxyoxanilide, 4,4'-dioctyloxyoxanilide, 2,2'-dioctyloxy-5,5'-ditert-butyloxanilide, 2,2'-didodecyloxy-5,5'-ditert-butyloxanilide.

The following are examples of hydroxylated aryl benzoates: phenyl salicylate, octylphenyl salicylate, 2,4-ditert-butylphenyl 3,5-ditert-butyl-4-hydroxybenzoate, resorcinol monobenzoate, di-(4-tert-butylbenzoyl)-resorcinol.

The following are examples of hydroxyphenyltriazines: 2,4,6-tris(2,4-dihydroxyphenyl)-1,3,5-triazine, 2,4-bis(2,4-dihydroxyphenyl)-6-(p-chlorophenyl)-1,3,5-triazine, 2,4-bis(2-hydroxyphenyl)-6-ethyl-1,3,5-triazine.

The following are examples of cinnamic acid derivatives: ethyl $\alpha$-cyano-$\beta$-phenylcinnamate, methyl $\alpha$-carbomethoxycinnamate, butyl $\alpha$-cyano-$\beta$-methyl-p-methoxycinnamate, isooctyl $\alpha$-cyano-$\beta$-phenylcinnamate.

UV absorbers of the benzotriazole and benzophenone type are particularly preferred.

The UV absorbers are used in the customary concentrations, in particular in an amount of 0.01 to 1% by weight, relative to the polyolefin.

An inorganic or organic pigment can be used as the pigment of the component $C_2$. It can be a white, black or coloured pigment. It can be an individual pigment or a mixture of pigments.

Examples of inorganic pigments are titanium dioxide, zinc oxide, barium carbonate, carbon black, cadmium sulfide, cadmium selenide, chromates, chromium oxides, iron oxides or lead oxides.

Examples of organic classes of pigments are azo pigments, anthraquinones, phthalocyanines, pyrrolopyrroles, quinacridones, isoindolines or perylene pigments.

The amount of pigment can vary within wide limits; in particular, 0.01 to 10% by weight, relative to the polyolefin, can be added.

The additives A, B and C can be added to the polyolefin individually or as a mixture. Addition is effected before or during the shaping of the polymer, for example by mixing with the pulverulent polymer or by addition to the melt of the polymer.

In addition to the stabilizers A, B and C according to the invention, it is also possible to add to the polymer other stabilizers, for example antioxidants of the phenol type, metal deactivators, phosphites and phosphonites or peroxide-destroying compounds of the type of organic thio compounds.

The following are examples of these:

1. Antioxidants 1.1. Alkylated monophenols, for example 2,6-ditert-butyl-4-methylphenol, 2-tert-butyl-4,6-dimethylphenol, 2,6-ditert-butyl-4-ethylphenol, 2,6-ditert-butyl-4-n-butylphenol, 2,6-ditert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol and 2,6-dinonyl-4-methylphenol.

1.2. Alkylated hydroquinones, for example 2,6-ditert-butyl-4-methoxyphenol, 2,5-ditert-butyl-hydroquinone, 2,5-ditert-amyl-hydroquinone and 2,6-di-phenyl-4-octadecyloxyphenol.

1.3. Hydroxylated thiodiphenyl ethers, for example 2,2'-thio-bis-(6-tert-butyl-4-methylphenol), 2,2'-thio-bis-(4-octylphenol), 4,4'-thio-bis-(6-tert-butyl-3-methylphenol) and 4,4'-thio-bis-(6-tert-butyl-2-methylphenol).

1.4. Alkylidenebisphenols, for example 2,2'-methylene-bis-(6-tert-butyl-4-methylphenol), 2,2'-methylene-bis-(6-tert-butyl-4-ethylphenol), 2,2'-methylene-bis-[4-methyl-6-($\alpha$-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-ditert-butylphenol), 2,2'-ethylidene-bis-(4,6-di-tert-butylphenol), 2,2'-ethylidene-bis-(6-tert-butyl-4-isobutylphenol), 2,2'-methylene-bis-[6-($\alpha$-methylbenzyl)-4-nonylphenol], 2,2'-methylene-bis-[6-($\alpha,\alpha$-dimethylbenzyl)-4-nonylphenol], 4,4'-methylene-bis-(2,6-ditert-butylphenol), 4,4'-methylene-bis-(6-tert-butyl-2-methylphenol), 1,1-bis-(5-tert-butyl-4-hydroxy-2-methylphenyl)-butane, 2,6-bis-(3-tert-butyl-5-methyl-2-hydroxybenzyl)-4-methylphenol, 1,1,3-tris-(5-tert-butyl-4-hydroxy-2-methylphenyl)-butane, 1,1-bis-(5-tert-butyl-4-hydroxy-2-methylphenyl)-3-n-dodecylmercaptobutane, ethylene glycol bis-[3,3-bis-(3'-tert-butyl-4'-hydroxyphenyl)-butyrate], bis-(3-tert-butyl-4-hydroxy-5-methylphenyl)-dicyclopentadiene and bis-[2-(3'-tert-butyl-2'-hydroxy-5'-methylbenzyl)-6-tert-butyl-4-methylphenyl]terephthalate.

1.5. Benzyl compounds, for example 1,3,5-tris-(3,5-ditert-butyl-4-hydroxybenzyl)-2,4,6-trimethylbenzene, bis-(3,5-ditert-butyl-4-hydroxybenzyl) sulfide, isooctyl 3,5-ditert-butyl-4-hydroxybenzylmercaptoacetate, bis-(4-tert-butyl-3-hydroxy-2,6-dimethylbenzyl)dithiol terephthalate, 1,3,5-tris-(3,5-ditert-butyl-4-hydroxybenzyl) isocyanurate, 1,3,5-tris-(4-tert-butyl-3-hydroxy-2,6-dimethylbenzyl) isocyanurate, dioctadecyl 3,5-ditert-butyl-4-hydroxybenzylphosphonate, the Ca salt of monoethyl 3,5-ditert-butyl-4-hydroxybenzylphosphonate and 1,3,5-tris-(3,5-dicyclohexyl-4-hydroxybenzyl) isocyanurate.

1.6. Acylaminophenols, for example 4-hydroxylauranilide, 4-hydroxystearanilide, 2,4-bis-(octylmercapto)-6-(3,5-ditert-butyl-4-hydroxyanilino)-s-triazine and octyl N-(3,5-ditert-butyl-4-hydroxyphenyl)-carbamate.

1.7. Esters of β-(3,5-ditert-butyl-4-hydroxyphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris-(hydroxyethyl) isocyanurate and N,N'-bis-(hydroxyethyl)-oxamide.

1.8. Esters of β-(5-tert-butyl-4-hydroxy-3-methylphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris-(hydroxy)ethyl isocyanurate and N,N'-bis-(hydroxyethyl)-oxamide.

1.9. Esters of β-(3,5-dicyclohexyl-4-hydroxyphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, tris-(hydroxy)ethyl isocyanurate and N,N'-bis-(hydroxyethyl)-oxamide.

2. Metal deactivators, for example N,N'-diphenyloxamide, N-salicylal-N'-salicyloylhydrazine, N,N'-bis-(salicyloyl)-hydrazine, N,N'-bis-(3,5-ditert-butyl-4-hydroxyphenylpropionyl)-hydrazine, 3-salicyloylamino-1,2,4-triazole and bis-(benzylidene)-oxalic acid dihydrazide.

3. Phosphites and phosphonites, for example triphenyl phosphite, diphenylalkyl phosphites, phenyldialkyl phosphites, tris-(nonylphenyl) phosphite, trilauryl phosphite, trioctadecyl phosphite, distearyl pentaerythritol diphosphite, tris-(2,4-ditert-butylphenyl) phosphite, diisodecylpentaerythritol diphosphite, bis-(2,4-ditert-butylphenyl)-pentaerythritol diphosphite, tris-tearylsorbitol triphosphite, tetrakis-(2,4-ditert-butylphenyl) 4,4'-biphenylenediphosphonite and 3,9-bis-(2,4-ditert-butyl-phenoxy)-2,4,8,10-tetraoxa-3,9-diphosphaspiro [5.5] undecane.

4. Compounds which destroy peroxides, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide and pentaerythritol tetrakis-(β-dodecylmercapto)-propionate.

Amongst these, the addition of antioxidants of the phenol type is of particular importance.

Additionally, it is also possible to add other additives such as are customary for polyolefins, for example fillers, lubricants, fire-retarding agents or antistatic agents.

The polyolefins stabilized in this manner can be used in a very wide variety of shapes, for example as films, fibres, tapes, sheets, bottles, tubes or other profiles.

The following example illustrates the invention in greater detail. In this example, unless otherwise indicated, parts and % are by weight.

EXAMPLE 1

The stabilization of small injection-moulded polypropylene sheets 100 parts of polypropylene powder [melt flow index 2.4 g/10 minutes (230° C./2160 g)] are mixed with 0.05 part of pentaerythrityl tetrakis-[β-(3,5-ditert-butyl-4-hydroxyphenyl)-propionate], 0.05 part of tris-(2,4-ditert-butylphenyl) phosphite, 0.1 part of Ca stearate and the additives indicated in Tables 1 and 2 in a drum mixer, and are then granulated in an extruder at a temperature of 200° to 220° C.

The resulting granules are injection-moulded to give small sheets 2 mm thick at a temperature of 250° C. and a mould temperature of 60° C. in an injection moulding machine.

The small polypropylene sheets prepared in this manner are subjected to weathering in Florida. The impact strength of the samples is measured at regular intervals of time. The irradiation energy (in kilolangleys, klys) until the residual impact strength is 50% is taken as a measure of the protective action of the stabilization systems.

The following light stabilizers are used:
LS-1 Polyester of the formula

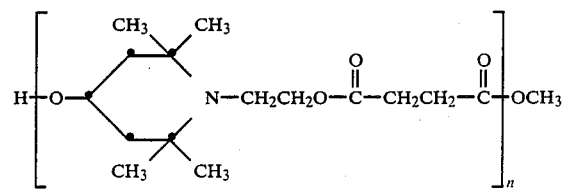

UV-1 Benzotriazole UV absorber of the formula

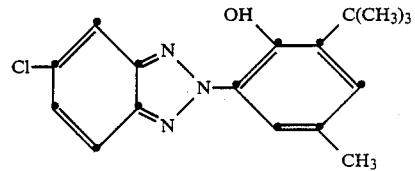

UV-2 Benzophenone UV absorber of the formula

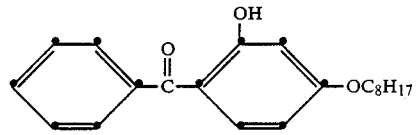

Table 1 shows the action of magnesium stearate and Table 2 that of zinc stearate, as the component B. The quantity data in % relate to the polypropylene.

TABLE 1

| Light stabilizer | Mg stearate | Pigment | Klys in Florida until 50% of impact strength is lost |
|---|---|---|---|
| 0.05% LS-1 | — | — | 36 |
| 0.05% LS-1 | 0.1% | — | 73 |
| 0.05% LS-1 + 0,05% UV-1 | — | — | 102 |
| 0.05% LS-1 + 0,05% UV-1 | 0.1% | — | ~195 |
| 0.05% LS-1 + 0,05% UV-2 | — | — | 91 |
| 0.05% LS-1 + 0,05% UV-2 | 0.1% | — | ~220 |
| 0.05% LS-1 | — | 0.5% TiO₂ | 76 |
| 0.05% LS-1 | 0.1% | 0.5% TiO₂ | 164 |

TABLE 2

| Light stabilizer | Zn stearate | Pigment | Klys in Florida until 50% of impact strength is lost |
|---|---|---|---|
| 0.05% LS-1 | — | — | 36 |

TABLE 2-continued

| Light stabilizer | Zn stearate | Pigment | Klys in Florida until 50% of impact strength is lost |
|---|---|---|---|
| 0.05% LS-1 | 0.1% | — | 68 |
| 0.05% LS-1 + 0.05% UV-1 | — | — | 102 |
| 0.05% LS-1 + 0.05% UV-1 | 0.1% | — | ~190 |
| 0.05% LS-1 + 0.05% UV-2 | — | — | 91 |
| 0.05% LS-1 + 0.05% UV-2 | 0.1% | — | ~170 |
| 0.05% LS-1 | — | 0.5% TiO$_2$ | 76 |
| 0.05% LS-1 | 0.1% | 0.5% TiO$_2$ | ~160 |

What is claimed is:

1. A polyolefin stabilized against damage caused by light and containing
   (A) at least one polyalkylpiperidine light stabilizer,
   (B) an organic salt of zinc or magnesium and
   (C) either
      (C$_1$) a UV absorber or
      (C$_2$) a pigment or
      (C$_3$) a UV absorber and a pigment.

2. Stabilized polypropylene according to claim 1.

3. A stabilized polyolefin according to claim 1, containing, as the component A, a light stabilizer the molecule of which contains at least one group of the formula I

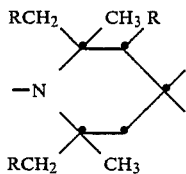

in which R is hydrogen or methyl.

4. A stabilized polyolefin according to claim 3, in which R in formula I is hydrogen.

5. A stabilized polyolefin according to claim 1, in which the component B is a salt of the formula MeL$_2$ in which Me is zinc or magnesium and L is the anion of an organic acid or of an enol.

6. A stabilized polyolefin according to claim 5, in which L is the anion of an organic carboxylic acid having up to 24 C atoms.

7. A stabilized polyolefin according to claim 5, in which L is the enolate anion of a $\beta$-dicarbonyl compound having 5–20 C atoms.

8. A stabilized polyolefin according to claim 5, in which L is the anion of acetic acid, oenanthic acid, lauric acid, stearic acid or acetylacetone.

9. A stabilized polyolefin according to claim 1, in which the component C is a UV absorber of the 2-(2-hydroxyphenyl)-benzotriazole or 2-hydroxybenzophenone type.

10. A stabilized polyolefin according to claim 1, in which the component C is a pigment.

11. A stabilized polyolefin according to claim 10, in which the component C is a TiO$_2$ pigment.

12. A stabilized polyolefin according to claim 1, containing 0.01–5% by weight of the component A, 0.005–1% by weight of the component B and 0.01–1% by weight of the component C$_1$ or 0.01–10% by weight of the component C$_2$, in each case relative to the polyolefin.

13. A process for stabilizing polyolefins against damage caused by light by adding a mixture of stabilizers wherein the mixture consists of
   (A) at least one polyalkylpiperidine light stabilizer,
   (B) an organic salt of zinc or magnesium and
   (C) either
      (C$_1$) a UV absorber or
      (C$_2$) a pigment or
      (C$_3$) a UV absorber and a pigment.

* * * * *